US009182020B2

(12) United States Patent
Tokizaki et al.

(10) Patent No.: US 9,182,020 B2
(45) Date of Patent: Nov. 10, 2015

(54) WIPER MOTOR

(75) Inventors: Teppei Tokizaki, Kiryu (JP); Shigeki Ota, Kiryu (JP)

(73) Assignee: Mitsuba Corporation, Kiryu-shi, Gunma (JP)

( * ) Notice: Subject to any disclaimer, the term of this patent is extended or adjusted under 35 U.S.C. 154(b) by 91 days.

(21) Appl. No.: 13/991,925

(22) PCT Filed: Nov. 29, 2011

(86) PCT No.: PCT/JP2011/077569
§ 371 (c)(1),
(2), (4) Date: Jun. 6, 2013

(87) PCT Pub. No.: WO2012/077540
PCT Pub. Date: Jun. 14, 2012

(65) Prior Publication Data
US 2013/0255408 A1 Oct. 3, 2013

(30) Foreign Application Priority Data
Dec. 10, 2010 (JP) .................. 2010-276021

(51) Int. Cl.
*B60S 1/08* (2006.01)
*F16H 21/40* (2006.01)
(Continued)

(52) U.S. Cl.
CPC . *F16H 21/40* (2013.01); *B60S 1/08* (2013.01); *B60S 1/166* (2013.01); *B60S 1/185* (2013.01);
(Continued)

(58) Field of Classification Search
CPC ........... F16H 1/16; F16H 21/20; F16H 21/40; F16C 3/28; F16C 11/02; B60S 1/185; B60S 1/08; B60S 1/163; B60S 1/0807; B60S 1/26
USPC ................... 74/42, 395, 425, 600; 15/250.17, 15/250.16, 250.3, 250.12, 250.13; 318/443, DIG. 2
See application file for complete search history.

(56) References Cited

U.S. PATENT DOCUMENTS 2,749,498 A * 6/1956 Lautzenhiser et al. ........ 318/466
3,090,068 A * 5/1963 Brooks ....................... 15/250.17
(Continued)

FOREIGN PATENT DOCUMENTS

CN 1783658 A 6/2006
DE EP-0533052 A1 * 9/1992 ................ B60S 1/08
(Continued)

OTHER PUBLICATIONS

International Search Report for PCT/JP2011/077569 dated Feb. 2, 2012.
(Continued)

*Primary Examiner* — William Kelleher
*Assistant Examiner* — Bobby Rushing, Jr.
(74) *Attorney, Agent, or Firm* — McCormick, Paulding & Huber LLP

(57) ABSTRACT

A wiper motor 10 has a reduction mechanism 29 for reducing the rotational speed of a motor shaft 25 and transmitting the reduced speed, and a motion conversion mechanism 31 for converting the rotational motion of the reduction mechanism 29 into a rotational motion and transmitting the motion to the output shaft 30. A pair of first connection holes 50 and a pair of second connection holes 51 are formed on a worm wheel 35 at a position deviated in a radial direction from an axial center of the worm wheel so that each of the holes is opened at the side of one axial end side. The worm wheel 35 can be used for both cases in which the output shaft 30 is swung within a first swinging region and in which the output shaft 30 is swung within a second swinging region.

2 Claims, 7 Drawing Sheets

(51) Int. Cl.
*B60S 1/18* (2006.01)
*B60S 1/16* (2006.01)
*B60S 1/26* (2006.01)
*F16C 3/28* (2006.01)
*F16H 21/42* (2006.01)
*B60S 1/34* (2006.01)

(52) U.S. Cl.
CPC .................. *B60S 1/26* (2013.01); *B60S 1/3495* (2013.01); *F16C 3/28* (2013.01); *F16H 21/42* (2013.01); *Y10T 74/18184* (2015.01)

(56) References Cited

U.S. PATENT DOCUMENTS

| | | | |
|---|---|---|---|
| 5,566,577 A * | 10/1996 | Klar | 74/42 |
| 6,205,612 B1 * | 3/2001 | Tilli et al. | 15/250.16 |
| 6,940,194 B1 * | 9/2005 | Lauk | 310/90 |
| 7,657,962 B2 * | 2/2010 | Bendo | 15/250.3 |
| 2006/0117514 A1 | 6/2006 | Yagi et al. | |
| 2006/0284584 A1 * | 12/2006 | Hawighorst et al. | 318/445 |
| 2007/0226939 A1 * | 10/2007 | Takada | 15/250.31 |
| 2008/0282491 A1 * | 11/2008 | Matsumoto et al. | 15/250.13 |

FOREIGN PATENT DOCUMENTS

| | | |
|---|---|---|
| JP | 8310350 A | 11/1996 |
| JP | 2006151092 A | 6/2006 |
| JP | 2007189759 A | 7/2007 |

OTHER PUBLICATIONS

Chinese Office Action and English Translation for Chinese Application Serial No. 201180058455.3 dated Dec. 3, 2014.

* cited by examiner

WIPER MOTOR

CROSS-REFERENCE TO RELATED APPLICATION

This application is entitled to the benefit of and incorporates by reference essential subject matter disclosed in International patent application Ser. No. PCT/JP2011/077569 filed on Nov. 29, 2011 and Japanese patent application Ser. No. JP2010-276021 filed on Dec. 10, 2010.

TECHNICAL FIELD OF THE INVENTION

The present invention relates to a wiper motor for driving a wiper member mounted on an automobile and so on.

BACKGROUND OF THE INVENTION

As a drive source for driving a wiper member, a wiper motor is used in a rear wiper device for wiping a rear window glass mounted on a vehicle such as an automobile. The wiper motor has an electric motor such as a brushed motor. A speed reduction mechanism and a motion conversion mechanism are contained in a gear case mounted on the electric motor. The speed reduction mechanism comprises a worm rotated by the electric motor and a worm wheel meshing with the worm. The rotation of the electric motor is reduced by the speed reduction mechanism and then transmitted to the worm wheel. A turning motion of the worm wheel is converted into a swinging motion by the motion conversion mechanism and transmitted to an output shaft. The wiper member attached to a distal end of the output shaft is swung back and forth within a predetermined angular range.

As such a wiper motor, for example, as described in JP 2006-151092, there are a narrow-angle type (link type) with a narrow range of swing of the wiper member and a wide-angle type (differential gear) with a wide range of swing of the wiper member. The motion conversion mechanism mounted on the wiper motor of the narrow-angle type has a pivoting lever fixed to a proximal end of the output shaft, and a connecting rod converting the turning motion of the worm wheel into the swinging motion and transmitting the swinging motion to the pivoting lever. The connecting rod is rotatably connected to the worm wheel at a position deviating in a radial direction from an axial center of the worm wheel.

On the other hand, the motion conversion mechanism mounted on the wiper motor of the wide-angle type has a output gear (gear wheel) integrally pivoting and a motion conversion member (sector gear) converting the rotary motion of the worm wheel into the swinging motion and transmitting the swinging motion to the output gear. One end portion of the motion conversion member is rotatably connected to the worm wheel at a position deviating in a radial direction from an axial center of the worm wheel and another end is a sector gear portion (gear tooth) meshing with the output gear. A retaining plate (retaining lever) swingably connecting the output shaft and a gear shaft (swinging center axial) set at an axial center of the sector gear portion is set up and retains meshing of the output gear and the sector gear portion.

By the way, a connecting hole is formed in the worm wheel to fit the connecting shaft into at a position deviated in a radial direction from the axial center of the worm wheel, and the forming position of the connecting hole is set based on the wiping range of the wiper member, the position of the output shaft and so on. There is also a known wiper motor in which at least one pair of connecting holes are formed in the worm wheel so that the stopping position of the wipe member can be set at either inverted position. In this case, in the worm wheel of the narrow-angle type, the pair of connecting holes is formed at positions symmetrical to each other from the axial center of the worm wheel. On the other hand, in the worm wheel of the wide-angle type, a pair of connecting holes is formed at positions deviated circumferentially from positions symmetrical to each other from the axial center of the worm wheel by considering meshing between the output gear and the sector gear portion.

Thus, since the wide-angle type and the narrow-angle type have different wiping range of the wiper member or different positional relations between the pair of connecting holes, the positions of the connecting holes formed in the worm wheel are different therebetween. Conventionally, therefore, the worm wheel in which the connecting holes corresponding to the wide-angle type are formed and the worm wheel in which the connecting holes corresponding to the narrow-angle type are formed are prepared separately so to respond to either the wide-angle type or the narrow-angle type. However, since the increase of the number of types of worm wheels increased, complicated parts control, complicated mold change work because of an increase in the number of molds or inserts, the productivity of wiper motor decreased or cost increased.

An object of the present invention is that a worm wheel can be used in both cases that the output shaft swings in a first swinging range and that the output shaft swings in a second swinging range, thereby improving the productivity of the wiper motor.

SUMMARY OF THE INVENTION

The wiper motor of the present invention has a motor body, and a motion conversion mechanism converting turning motion of the motor body into swinging motion having a first swing range or a second swing range narrower than the first swing range and transmitting the swinging motion to an output shaft, comprising: a worm turingly driven by the motor body; a worm wheel meshing with the worm, in which at least a pair of first connecting holes being basis of the first swing range and at least a pair of second connecting holes being basis of the second swing range are formed at a position deviated in a radial direction from an axial center of the worm wheel so that each of the holes is opened at the side of one axial end side; and a connecting shaft rotatably connecting a first motion conversion member to one of the first connecting holes formed in the worm wheel if the motion conversion mechanism comprises the first motion conversion member meshing with an output gear integrally rotating with the output shaft and swinging the output shaft within the first swing range, or rotatably connecting a second motion conversion member to one of the second connecting holes formed in the worm wheel if the motion conversion mechanism comprises the second motion conversion member rotatably connected to a lever member integrally rotating with the output shaft and swinging the output shaft within the second swing range.

The wiper motor of the present invention further comprise: a feed circuit electrically connected to the electric motor; and a relay plate attached to an end face on the other axial end side in a radial direction of the worm wheel and switching between a short-circuited state mutually electrically connecting a plurality of contact plates set in the feed circuit and a non-short-circuited state disconnecting the connection, associated with rotation of the worm wheel, wherein a contact position between the relay plate and the contact plates is set up at a position equivalent to an assembling position of the electric motor when the output shaft is swung within the first swing range and the output shaft is swung within the second swing range.

The wiper motor of the present invention is wherein the position of the output shaft is set up with deviated from each other when the output shaft is swung within the first swing range and the output shaft is swung within the second swing range.

The wiper motor of the present invention is wherein an angle between line segments connecting the axial center of the worm wheel and each of axial centers of the pair of the first connecting holes and an angle between line segments connecting the axial center of the worm wheel and each of axial centers of the pair of the second connecting holes are different.

The wiper motor of the present invention is wherein a distance from the axial center of the worm wheel to an axial center of the first connecting hole and a distance from the axial center of the worm wheel to an axial center of the second connecting hole are different.

According the present invention, since the first connecting holes and the second connecting holes are formed in the worm wheel, the worm wheel can be used in both cases that the output shaft is swung within the first swing range and that the output shaft is swung within the second swing range. Since the worm wheel can be commonly used in both cases that the output shaft is swung within the first swing range and that the output shaft is swung within the second swing range, it is not necessary to prepare different worm wheels for the both cases that the output shaft is swung within the first swing range and that the output shaft is swung within the second swing range, and thus, the number of types of worm wheels can be reduced. Therefore, it makes the control of parts of the worm wheel easy, and the mold replacement work easy by reducing the number of molds or inserts for molding the worm wheel and then, it can be possible to improve the productivity of wiper motor and reduce cost.

According to the present invention, a contact position between the relay plate and the contact plates is set up at a position equivalent to an assembling position of the electric motor when the output shaft is swung within the first swing range and the output shaft is swung within the second swing range. This enables the connector unit and the relay plate for feeding to the electric motor to be used in both the cases that the output shaft is swung within the first swing range and that the output shaft is swung within the second swing range, thereby reducing the number of types of connector units and relay plates. Therefore, it makes the control of parts of connector unit and the relay plate easy, and the mold replacement work easy by reducing the number of molds or inserts for shaping parts of the connector unit or the replay plate and then, it can be possible to improve the productivity of wiper motor and reduce cost.

According to the present invention, the position of the output shaft is set up with deviated from each other when the output shaft is swung within the first swing range and the output shaft is swung within the second swing range. The positions for forming the connecting holes are set based on the wiping range of the wiper member, the position of the output shaft, or so on. When the position of the output shaft is set up with deviated between the case that the output shaft is swung within the first swing range and the case that the output shaft is swung within the second swing range, even if a contact position between the relay plate and the contact plates is set up at a position equivalent to an assembling position of the electric motor, it is possible to form the first connecting holes and the second connecting holes, respectively, in the worm wheel without overlapping the first connecting holes and the second connecting holes with each other.

BRIEF DESCRIPTIONS OF THE DRAWINGS

DESCRIPTIONS OF THE PREFERRED EMBODIMENTS

Hereinafter, embodiments of the present invention are described in detail on the basis of drawings.

Figure 1:
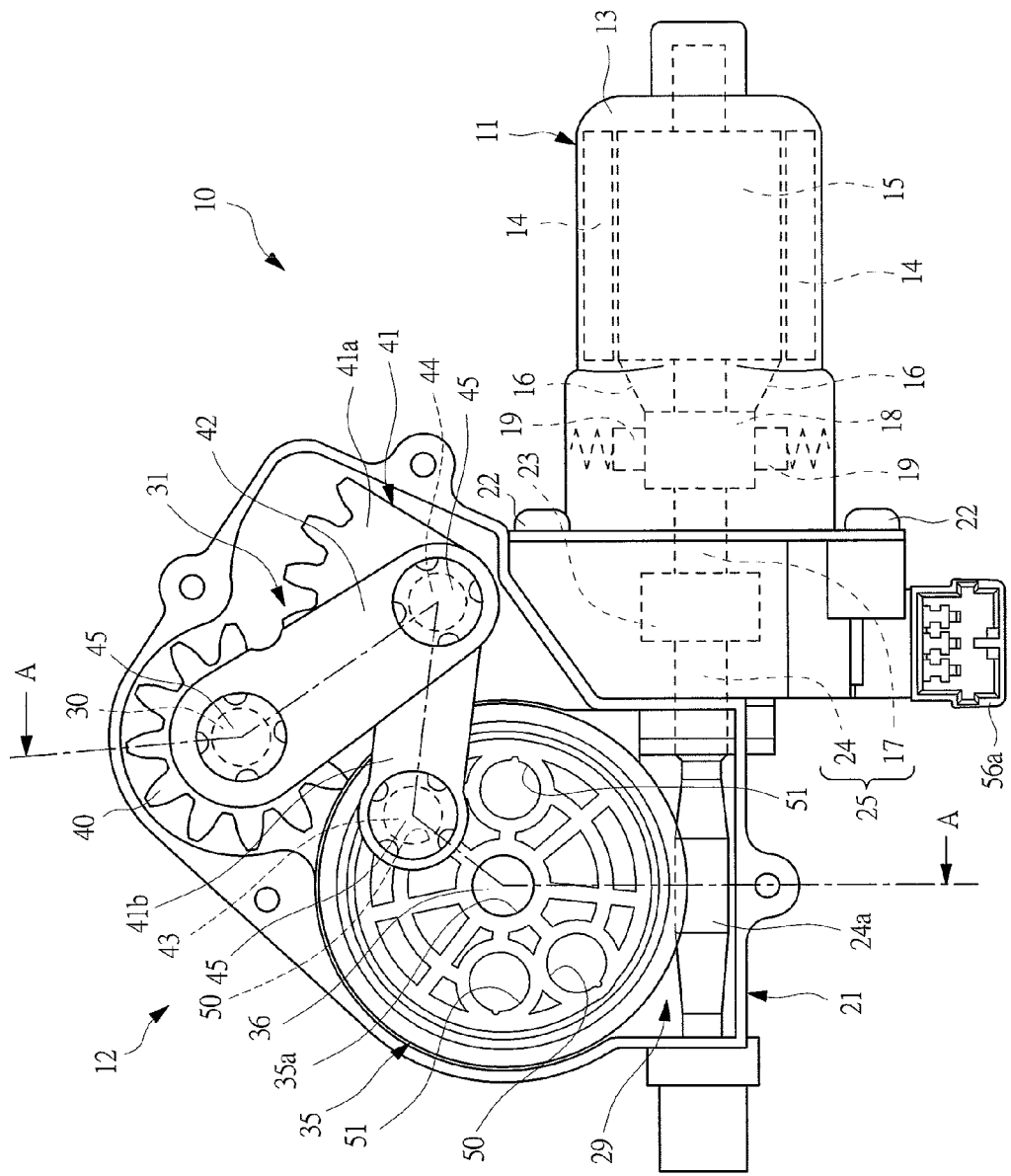
FIG. 1 is a diagram showing a wiper motor wiping the first swing range of the embodiment of the present invention.

A wiper motor 10 shown in FIG. 1 is used as a drive source of a rear wiper device for wiping a rear window glass mounted on a vehicle such as an automobile. This wiper motor 10 has a motor body (electric motor) 11, and a gear unit portion 12 comprising a motion conversion mechanism converting turning motion of the motor body 11 into swinging motion and transmitting the swinging motion.

The motor body 11 is a brushed DC motor, and comprises a motor case (yoke) 13 formed by pressing a thin steel sheet or the like to a cylinder with a bottom. A plurality of arc-shape permanent magnets 14 magnetized to the N pole and the S pole in a radially inward direction respectively face each other and fastened to an inner periphery of motor case 13. An armature 15 facing each permanent magnet 14 via a micro space is rotatably contained inside motor case 13, and a plurality of coils 16 are wound around the armature 15. An armature shaft 17 is fixed by penetrating to a turning center of the armature 15, and one end portion of armature shaft 17 is rotatably supported on a bottom wall of the motor case 13.

A cylindrical commutator 18 is fixed to the armature shaft 17 adjacent to the armature 15. An end portion of each coil 16 is electrically connected to the commutator 18. A pair of brushes 19 is in sliding contact with an outer periphery of the commutator 18, respectively. When a drive current is supplied to coils 16 via each brush 19 and the commutator 18, an electromagnetic force torque is generated in the armature 15 in rotational direction, and then, the armature shaft 17 is rotatably driven at a predetermined rotational speed.

A gear frame 21 of the gear unit portion 12 is attached to the motor body 11 on an opening side of the motor case 13. The gear frame 21 is opened to the motor case 13. The gear frame 21 is fixed to the motor case 13 by fastening screws 22 with striking each opening end each other.

The other axial end of the armature shaft 17 projects into the gear frame 21, and is coaxially joined to the worm shaft 24 via a joining member 23 so that the worm shaft 24 is integrally turned with the armature shaft 17. That is, a motor shaft 25 of the motor body 11 is a divided shaft divided into the armature shaft 17 and the worm shaft 24. The worm shaft 24 is rotatably contained in the gear frame 21, and a worm 24a with a helical teeth portion is formed on an outer periphery of the worm shaft 24. The motor shaft 25 is not limited to the divided shaft structure, and the armature shaft 17 may be integrally molded with the worm shaft 24.

Figure 2:
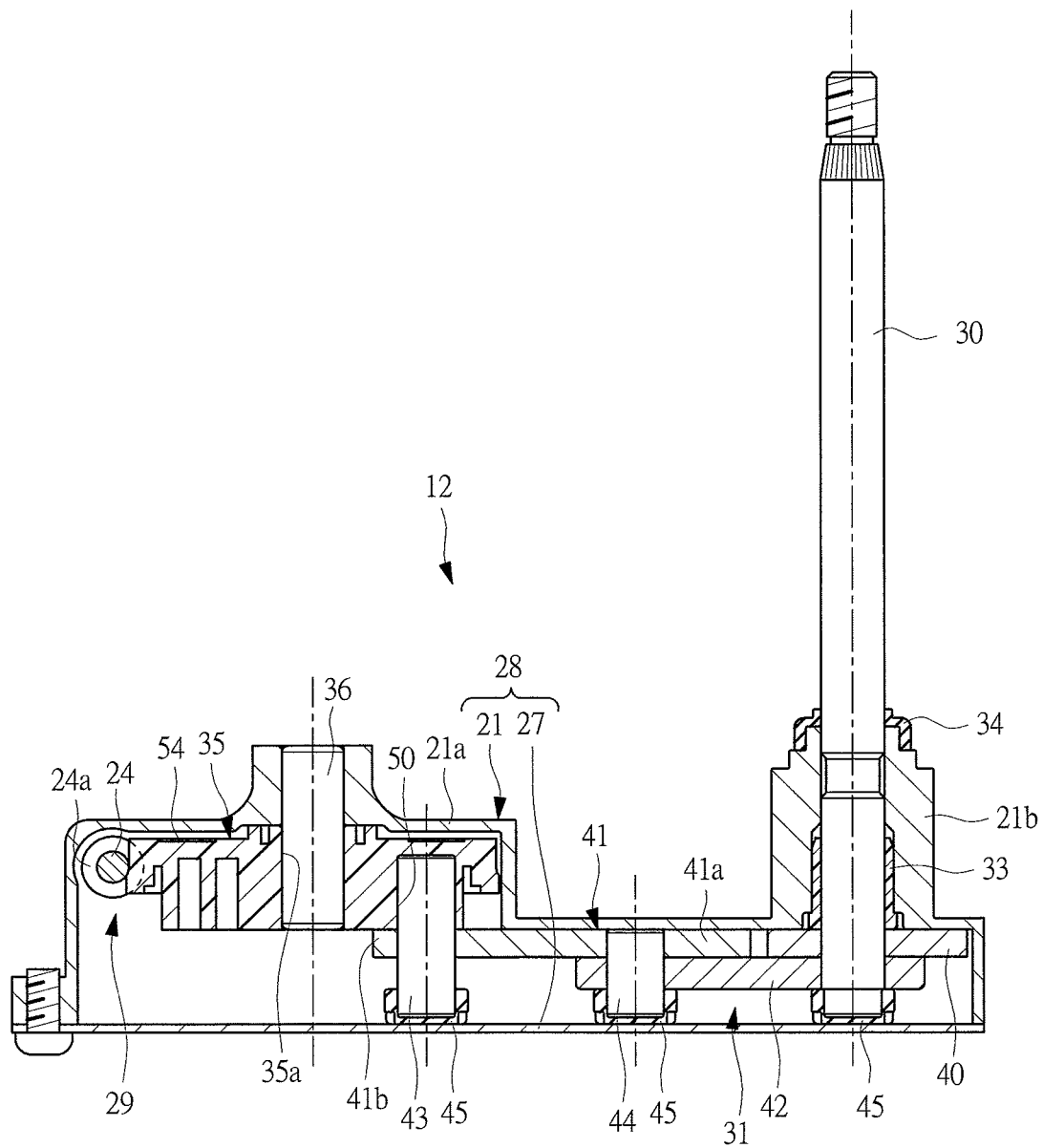
FIG. 2 is a cross-sectional diagram along the line A-A in FIG. 1.

As shown in FIG. 2, the gear frame 21 is formed by aluminum die casting at a bottom opening on the side perpendicular to the axial direction of the motor shaft 25, and forms a gear case 28 with a gear cover 27 closing an opening of the gear frame 21. The gear cover 27 is set up at given intervals to the bottom wall 21a of the gear frame 21 and a storage space is formed between those bottom walls 21a and the gear cover 27. Inside the gear case 21, a speed reduction mechanism 29 which reduces the speed of rotation of the motor shaft 25 and transmits the rotation, and a motion conversion mechanism 31 which converts a rotary motion of the speed reduction mechanism 29 into a swinging motion and transmits the swinging motion to an output shaft 30 are contained.

FIG. 1 is diagram of the wiper motor 10 without the gear cover 27 and shows a structure inside the gear unit portion 12. The gear cover 27 is formed in a predetermined shape by a steel sheet or the like. The wiper motor 10 is fixed to a vehicle body by a bracket portion (not shown) integrated with the gear cover 27.

The output shaft 30 is formed of a round bar made of metal such as steel iron. The axial direction of the output shaft 30 faces an axial direction perpendicular to the axial direction of the motor shaft 25, that is, perpendicular to the bottom wall 21a of the gear frame 21. The output shaft 30 has a proximal end contained in the gear frame 21, a distal end extending outside of the gear frame 21, and is set up so as to pass through the bottom wall 21a of the gear frame 21. A substantially-cylindrical shaft retaining portion 21b projecting outside of the gear frame 21 along an outer periphery of the output shaft 30 is integrally formed at the bottom wall 21a of the gear frame 21. The output shaft 30 is inserted to the shaft retaining portion 21b and rotatably supported by the shaft retaining portion 21b. The distal end of the output shaft 30 projects from the rear window glass outward from the vehicle body, and a wiper member (not shown) for wiping an outer face of the rear window glass is fixed at the distal end of the output shaft 30.

A plastic bearing member 33 is set up between an inner periphery of the shaft retaining portion 21b and the outer periphery of the output shaft 30. The output shaft 30 is rotatably supported on the shaft retaining portion 21b via the shaft bearing member 33. A seal member 34 is attached to a distal end of the shaft retaining portion 21b to prevent rainwater, dusts, and the like from entering the gear case 28.

The speed reduction mechanism 29 has the worm 24a rotated by the motor body 11 and a worm wheel 35 meshing with the worm 24a. The worm wheel 35 is formed into a substantially disk-like shape by injection molding of a resin material, and an outer periphery thereof comprises a teeth portion meshing with the worm 24a. In an axial center of the worm wheel 35, an axial hole 35a is formed in the axial direction, and a rotary shaft 36 which is fixed to the bottom wall 21a and extends parallel to the output shaft 30 is inserted into the axial hole 35a, and the worm wheel 35 is rotatably supported on the rotary shaft 36 within the gear frame 21. The speed reduction mechanism 29 comprising the worm 24a and the worm wheel 35 reduces the speed of rotation of the motor shaft 25 and transmits the rotation to the worm wheel 35.

The motion conversion mechanism 31 has a pinion gear (output gear) 40 fixed on the proximal end of the output shaft 30, a first motion conversion member (hereinafter referred to "motion conversion member for wide-angle") 41 converting a rotary motion of the worm wheel 35 into a swinging motion and transmitting the swinging motion to the pinion gear 40, and a retaining plate 42 swingably connecting the pinion gear 40 and the motion conversion member 41. The motion conversion member 41 comprises a sector gear portion 41a meshing with the pinion gear 40 and an arm portion 41b connected to the worm wheel 35 and is formed to a flat-plate-like shape from a metal material such as a steel sheet.

As shown in FIG. 2, the motion conversion member 41 is set up nearer to the gear cover 27 than the worm wheel 35. A connecting shaft 43 is fixed on the arm portion 41b of this motion conversion member 41 and is rotatably connected at one of a pair of first connecting holes 50. That is, the motion conversion member 41 is rotatably connected to the worm wheel 35 by the connecting shaft 43 set up at a position radially deviated from an axial center C2 of the worm wheel 35. The pinion gear 40 is a spur gear and integrally rotated with the output shaft 30 by being fixed to the proximal end of the output shaft 30. The pinion gear 40 is flush with the motion conversion member 41 and meshes with the sector gear portion 41a comprising a substantially-fan-like spur gear.

The retaining plate 42 is formed to a flat-plate-like shape from a metal material such as a steel sheet. The retaining plate 42 is set up nearer to the gear cover 27 than the pinion gear 40 and the motion conversion member 41 and extends between the pinion gear 40 and the sector gear portion 41a. A gear shaft 44 extending parallel to the output shaft 30 and the connecting shaft 43 is rotatably inserted at one end portion of this retaining plate 42 and is fixed to an axial center of the sector gear portion 41a. On the other hand, the output shaft 30 is rotatably inserted to the other end portion of the retaining plate 42. The retaining plate 42 swingably connects the gear shaft 44 to the output shaft 30, and the meshing state of the pinion gear 40 is retained to the sector gear portion 41a.

Sliding contact members 45 slidably abut on an inner face of the gear cover 27 are loaded to proximal ends of the output shaft 30, the connecting shaft 43, and the gear shaft 44, respectively.

The sliding contact members 45 are formed to a cap-like shape by an elastic material such as rubber, and are incorporated with compressed between the proximal end faces of the respective shafts 30, 43, and 44 and the inner face of the gear cover 27. By the elastic force of the sliding contact members 45, each of the respective shafts 30, 43, and 44 is biased in the axial direction and this axial movement of each member contained in the gear frame 21 is strongly suppresses.

When a wiper switch is turned on to operate the wiper motor 10, the worm wheel 35 is rotated by the motor body 11, and the connecting shaft 43 fixed to the arm portion 41b of the motion conversion member 41 is rotated centered on the rotary shaft 36 together with the worm wheel 35. Then, the gear shaft 44 fixed to the sector gear portion 41a of the motion conversion member 41 is swung centered on the output shaft 30, and the meshing between the sector gear portion 41a and the pinion gear 40 causes the output shaft 30 to swing back and forth at a predetermined swing angle. That is, the rotational motion of the wiper motor 11 is converted into a swinging motion and transmitted to the output shaft 30 via the speed reduction mechanism 29 by a first motion conversion mechanism (below, a motion conversion mechanism of the wide angle type) 31 composed of a differential gear structure, and the wiper member is swung back and forth within a predetermined swing range, that is, between both preset reversal positions.

Figure 3:
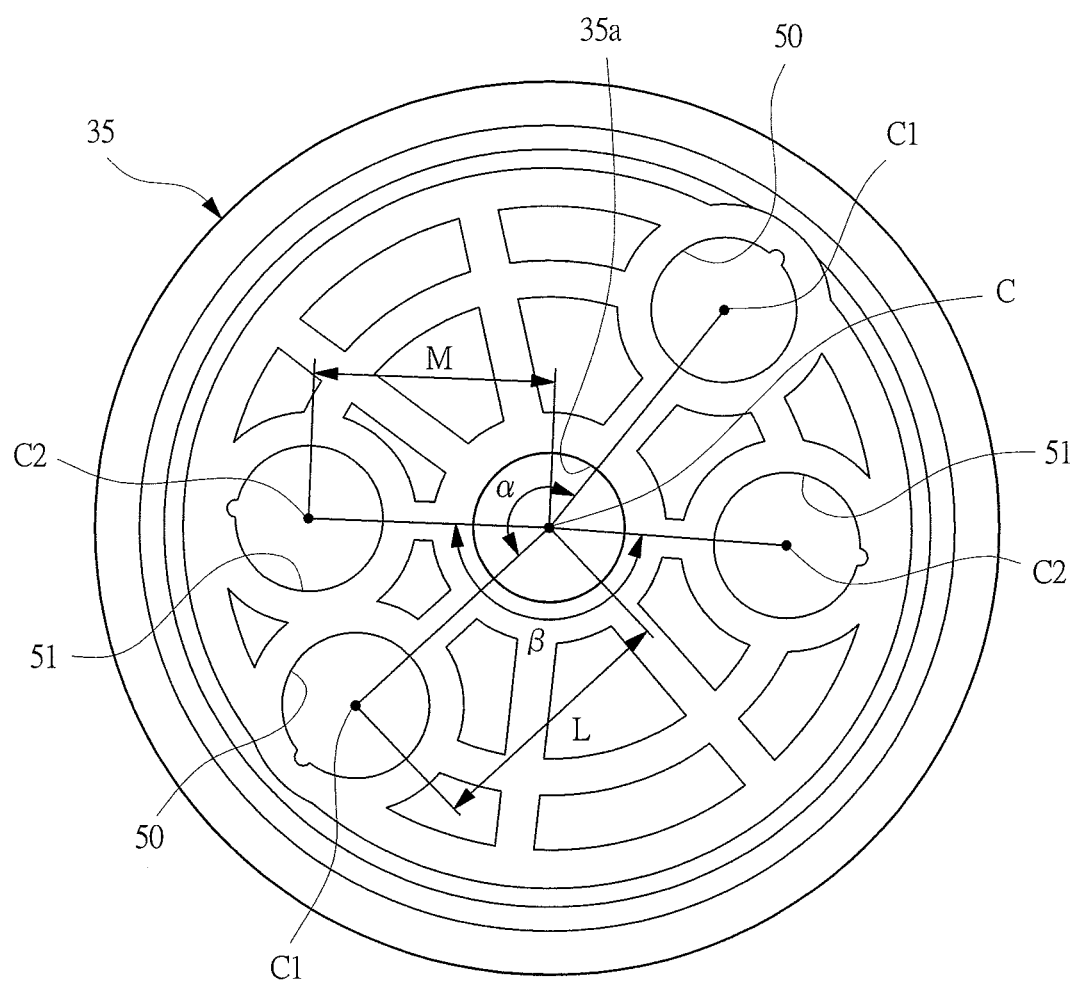
FIG. 3 is a diagram of a worm wheel.
Figure 4:
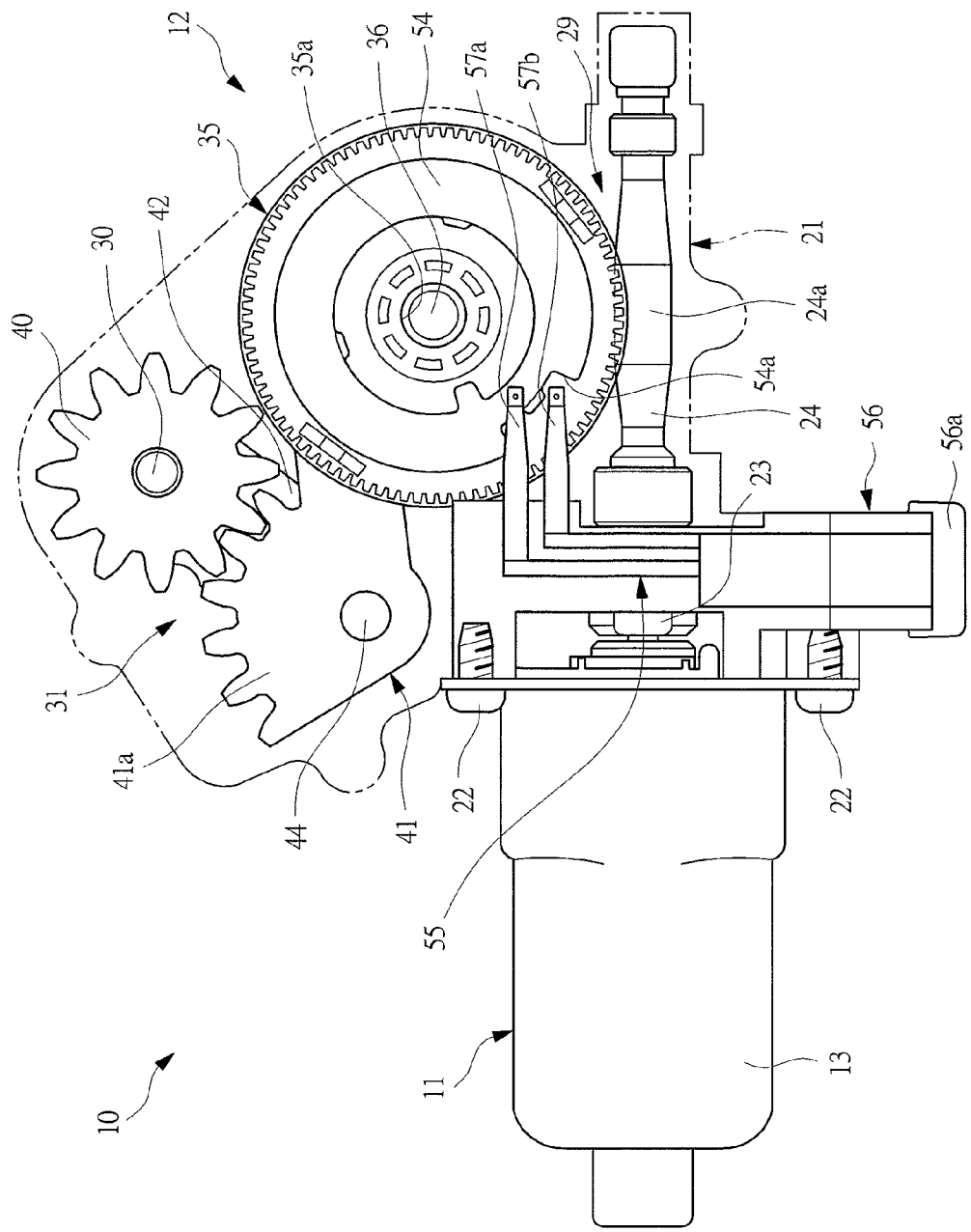
FIG. 4 is a rear view showing an inner structure of the wiper motor of FIG. 1.

Referring to FIGS. 3 and 4, FIG. 3 shows a diagram of the worm wheel 35 and FIG. 4 shows a rear view of the wiper motor 10 with the gear frame 21 not shown so that an inner structure of the wiper motor 10, including the worm wheel 35 may be seen.

In the worm wheel 35, a pair of first connecting holes (below, a connecting hole for wide angle) 50 and a pair of second connecting holes (below, a connecting hole for narrow angle) 51 are formed so as to be opened on one axial side facing the gear cover 27, respectively. Each of the connecting holes 50, 51 has the shape of a circular hole having a bottom on the other axial side, and the connecting holes 50, 51 have approximately the same shape each other.

The pair of connecting holes for wide angle 50 are formed so as to be deviated circumferentially from positions symmetrical to each other from the axial center C of the worm wheel 35, and an angle α between line segments connecting the axial center C of the worm wheel 35 and the axial centers C1 of the pair of connecting holes for wide angle 50 is set to be slightly less than 180°. The pair of connecting holes for wide angle 50 are formed being deviated radially from the axial center C of the worm wheel 35 by a distance L, and distances from the axial center C of the worm wheel 35 to the axial centers C1 of the pair of connecting holes for wide angle 50 are set to be equal to each other. That is, the axial centers C1 of the pair of connecting holes for wide angle 50 are set up circumferentially separated from each other by the angle α on a circle of the radius L centered on the axial center C of the worm wheel 35.

The pair of connecting holes for narrow angle 51 are formed symmetrically to each other from the axial center C of the worm wheel 35, and an angle β between line segments connecting the axial center C of the worm wheel 35 with each of axial centers C2 of the pair of connecting holes for narrow angle 51 is set at approximately 180°. The pair of connecting holes for narrow angle 51 are formed so as to be deviated radially from the axial center C of the worm wheel 35 by a distance M, and distances from the axial center C of the worm wheel 35 to the axial centers C2 of the pair of connecting holes for narrow angle 51 are set to be equal to each other. That is, the axial centers C2 of the pair of connecting holes for narrow angle 51 are set up circumferentially separated from each other by the angle β on a circle of the radius M centered on the axial center C of the worm wheel 35. The distance M from the axial center C of the worm wheel 35 to the axial center C2 of the connecting holes for narrow angle 51 is set to be less than the distance L from the axial center C to the worm wheel 35 to the axial centers C1 of the connecting holes for wide angle 50.

The wiper motor 10 shown in FIG. 1 is set to be a motor for wiping a first swing range, namely, a motor of the wide angle, and the arm portion 41b of the motion conversion member 41 for wide angle is rotatably connected to the worm wheel 35 via the connecting shaft 43 connected at one of the pair of connecting holes for wide angle 50. The position of the output shaft 30 in this wiper motor 10 is set up based on the wiping range of the wiper member, the positions for forming the connecting holes 50, and so on.

As seen in FIG. 4, a substatially-annular relay plate 54 set up on the same axial of the worm wheel 35 is attached to an end face of the other axial end side of the worm wheel 35. The relay plate 54 is molded by punching a conductive plate, and a cut portion 54a partially cut radially inward from an outer circumferential part is formed in a circumferential part of the relay plate 54.

The gear frame 21 attaches to a connector unit 56 with a feed circuit 55 for supplying drive current to the motor body 11 positioned between the motor body 11 and the worm wheel 35. The connector unit 56 has a connector retaining portion 56a connected to an external connector (not shown), and the feed circuit 55 is electrically connected to an on-vehicle battery or the like via the external connector.

The feed circuit 55 has a pair of feed terminals (not shown) connected electrically to a pair of brushes 19 of the motor body 11, respectively, and a pair of contact plates 57a and 57b slidingly contacted with the relay plate 54 and electrically contacted with the relay plate 54. The pair of contact plates 57a and 57b is switched between a short-circuited state mutually electrically connected via the relay plate 54 and a non-short-circuited state disconnecting the connection associated with to the rotation of the worm wheel 35. That is, one contact plate 57a is constantly electrically contacted with the relay plate 54, and is switched to the short-circuited state when the other contact plate 57b is electrically contacted with the relay plate 54, and is switched to the non-short-circuited state when the other contact plate 57b is set up at the cut portion 54a of the relay plate 54.

When the wiper switch is turned off in the short-circuited state of the pair of contact plates 57a and 57b, drive current is supplied to the motor body 11 and the wiper member is swingably driven. On the other hand, when the wiper switch has been turned off in the non-short-circuited state of the contact plates 57a and 57b, the feed circuit 55 is disconnected and the wiper member is stopped. A contact position between the contact plates 57a and 57b and the relay plate 54 is set up such that the contact plate 57b is located at the cut portion 54a when the wiper member is located at one reversal position. This causes the wiper member to stop automatically at a predetermined stop position, namely, the one reversal position, when the wiper switch is turned off.

It should be noted that in this embodiment, since the pair of connecting holes for wide angle 50 are formed in the worm wheel 35, if the other connecting hole for wide angle 50 with is connected with the connecting shaft 43, it is possible to automatically stop the wiper member at the other reversal position when the wiper switch is turned off. Considered the meshing between the sector gear portion 41a and the pinion gear 40, the pair of connecting holes for wide angle 50 is formed circumferentially deviated from positions symmetrical to each other from the axial center C of the worm wheel 35.

Figure 5:
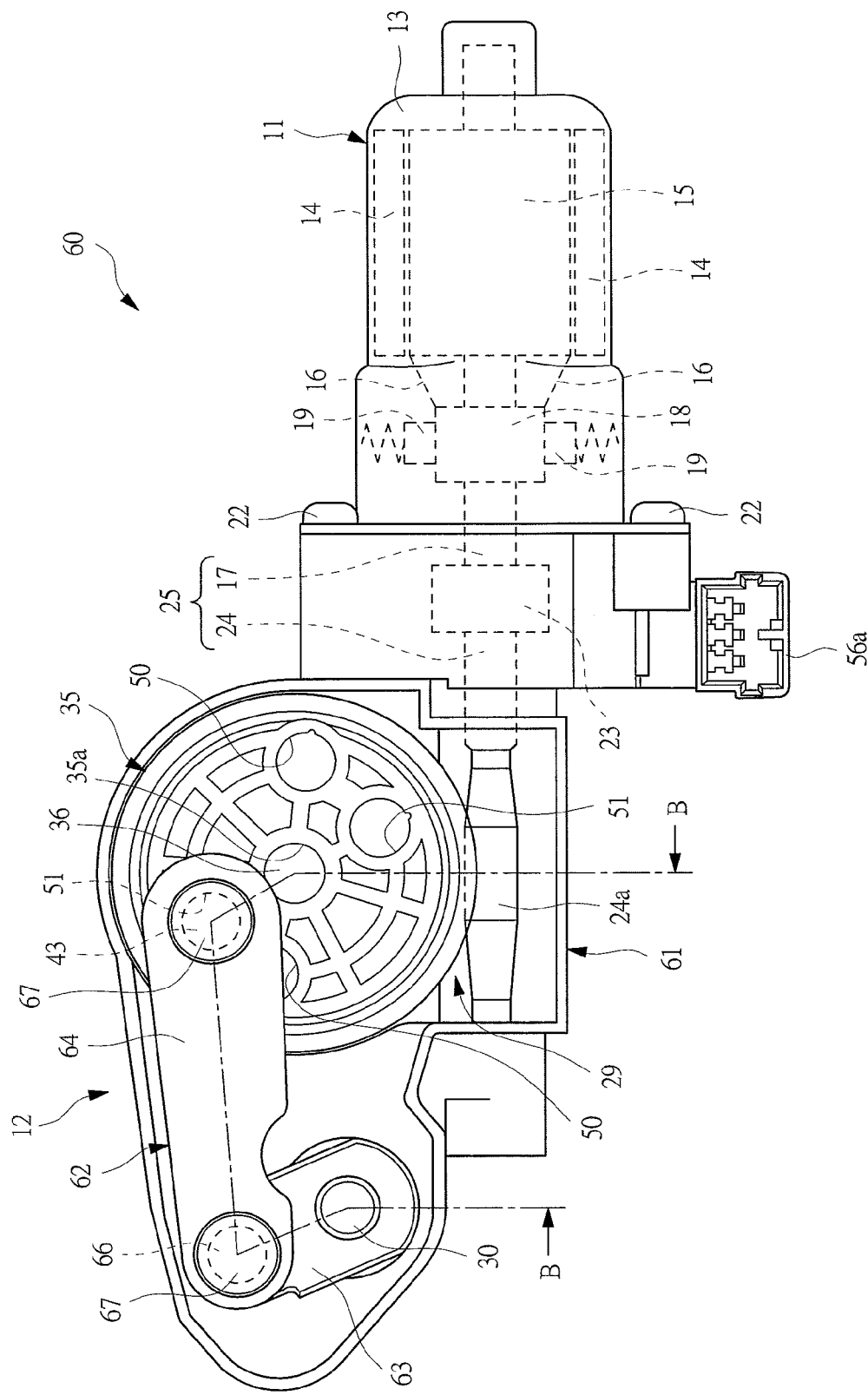
FIG. 5 is a diagram showing a wiper motor wiping the second swing range of the embodiment of the present invention.
Figure 6:
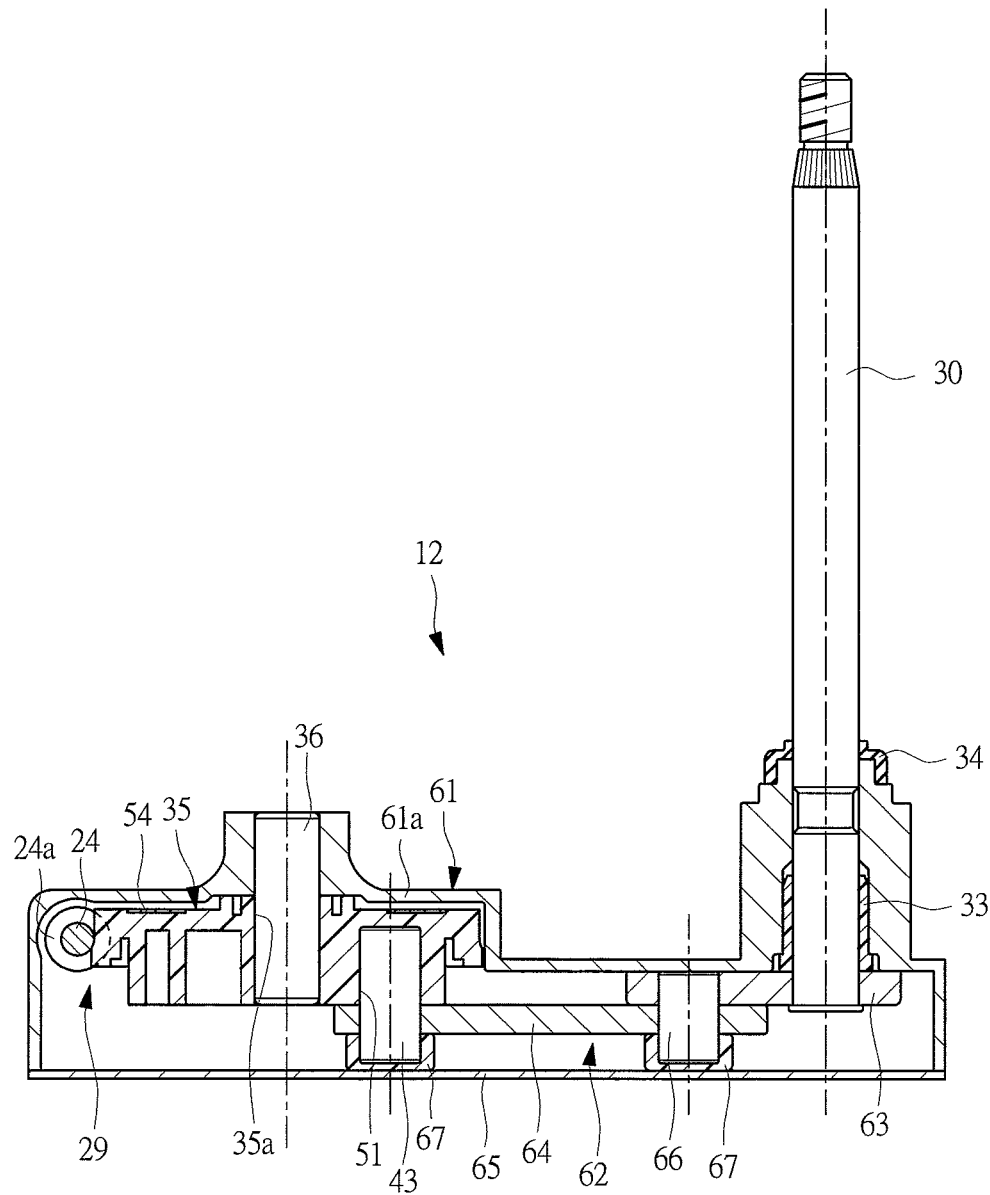
FIG. 6 is a cross-sectional diagram along the line B-B in FIG. 5.
Figure 7:
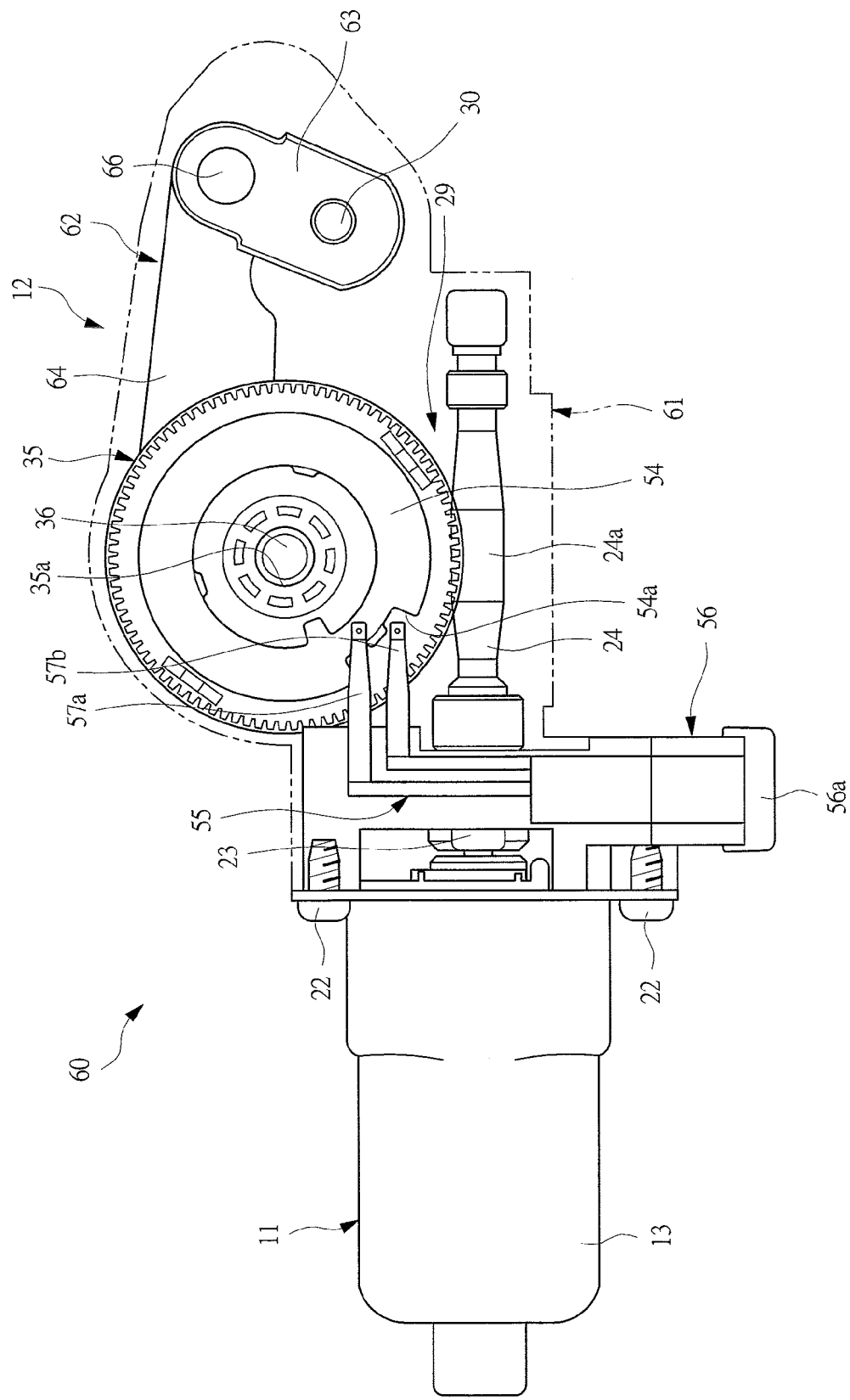
FIG. 7 is a rear view showing an inner structure of the wiper motor of FIG. 5.

The connecting holes for both wide angle 50 and narrow angle 51 are formed in this worm wheel 35, the worm wheel 35 can be used for both the wiper motor 10 of the wide angle type and a wiper motor 60 of the narrow angle type described later. FIG. 5 is a diagram showing a wiper motor wiping the second swing range of another embodiment of the present invention and FIG. 6 is a cross-sectional diagram along the line B-B in FIG. 5. FIG. 7 is a rear view showing an inner structure of the wiper motor of FIG. 5 and the gear frame 61 is not shown. In FIGS. 5 to 7, the same members as described above will be denoted by the same reference numerals with no explanation.

A motion conversion mechanism 62 included in this wiper motor 60 has a lever member 63 fixed to the proximal end of the output shaft 30, and a connecting rod 64 as a second motion conversion member (below, a motion conversion member for wide angle) converting a rotational motion of the worm wheel 35 into a swinging motion and transmitting the swinging motion to the lever member 63. The connecting rod 64 is formed in a flat-plate-like shape extending between the worm wheel 35 and the lever member 63 with a metal material such as a steel sheet.

As shown in FIG. 6, the connecting rod 64 is set up nearer to a gear cover 65 than the worm wheel 35, and the pivotal shaft 43 rotatably connected to the pair of connecting holes for narrow angle 51 of the worm wheel 35 is fixed on one end of the connecting rod 64. That is, the connecting rod 64 and the worm wheel 35 are mutually rotatably connected to each other by the connecting shaft 43 set up at a position deviated radially from the axial center of the worm wheel 35. The lever member 63 is set up nearer to a bottom wall 61a of the gear case 61 than the connecting rod 64, and one end thereof is fixed on the proximal end of the output shaft 30 and integrally rotated with the output shaft 30. A connecting shaft 66 extending parallel to the output shaft 30 and the connecting shaft 43 is rotatably inserted in the other end of the lever member 63, the connecting shaft 66 is fixed on the other end of the connecting rod 64, and the connecting shaft 66 rotatably connects the other end of the connecting rod 64 to the lever member 63.

Sliding contact members 67 slidably striking to an inner face of the gear cover 65 is loaded on abutting slidably on proximal ends of the connecting shafts 43 and 66. The sliding contact member 67 is formed to a cap-like shape by a resin material, and is between proximal faces of the connecting shafts 43 and 66 and the inner face of the gear cover 65. These sliding contact members 67 enable the connecting shafts 34 and 66 to smoothly slide on the gear cover 65.

When the wiper switch is turned on to operate the wiper motor 60, the motor body 11 makes the worm wheel 35 rotate, and the connecting rod 64 is swung around the output shaft 30. Then, the output shaft 30 swings back and forth at a predetermined swinging angle by the connection between the connecting rod 64 and the lever member 63. That is, a rotational motion of the worm wheel 35 is converted into a swinging motion and transmitted the motion to the output shaft 30 by the second motion conversion mechanism (below, a motion conversion mechanism of the narrow angle type) 62 of a link mechanism, and the wiper member is swingably drive between a predetermined swing range, namely, between both preset reversal positions.

The wiper motor 60 shown in FIG. 5 is set to a motor wiping the second wiping range narrower than the first wiping range, namely, a motor of the narrow angle type, and one end of the connecting rod 64 as a motion conversion member for the narrow angle is rotatably connected to the worm wheel 35 by the connecting shaft 43 connected to one of the pair of connecting holes for narrow angle 51. The position of the output shaft 30 in the wiper motor 60 of the narrow angle type is set based on the wiping range of the wiper member, the positions of formation of the connecting holes 51, and so on, and located deviated from the position of the output shaft 30 in the wiper motor 10 of the wide angle type. That is, the position of the output shaft 30 in the wiper motor 10 of the wide angle type and the position thereof in the wiper motor 60 of the narrow angle type are set up deviated from each other.

As shown in FIG. 7, the connector unit 56 is attached to the gear frame 61 between the motor body 11 and the worm wheel 35. A contact position between the pair of contact plates 57a and 57b set to the feed circuit 55 of the connector unit 56 and the relay plate 54 is set up such that the contact plate 57b is located at the cut portion 54a when the wiper member is located at one reversal position. Therefore, the wiper member automatically stops at a predetermined stop position, namely, the one reversal position, when the wiper switch is turned off.

In this embodiment, the pair of connecting holes for narrow angle 51 is formed in the worm wheel 35 and it is also possible to automatically stop the wiper member at the other reversal position when the wiper switch is turned off by connecting the connecting shaft 43 in the other connecting hole for narrow angle 51. The pair of connecting holes for narrow angle 51 is formed at positions symmetrical to each other from the axial center C of the worm wheel 35.

The contact position between the contact plates 57a and 57b and the relay plate 54 in the wiper motor 60 of the narrow angle type is set up at a position corresponding to the contact position between the contact plates 57a and 57b and the relay plate 54 in the wiper motor 10 of the wide angle type. That is, the contact position between the pair of contact plates 57a and 57b and the relay plate 54 in both the wiper motor 10 of the wide angle type and the wiper motor 60 of the narrow angle type are set up at positions equivalent to each other to an assembling position of the motor body 11.

Thus, since the connecting holes for both wide angle 50 and narrow angle 51 are formed in the worm wheel 35, the worm wheel 35 is usable in both the wiper motor 10 of the wide angle type and the wiper motor 60 of the narrow angle. That is, the worm wheel 35 can be applied to wiper motors having different rotational angles of the output shaft 30 or different wiping angles without using different worm wheels 35. Therefore, since the worm wheels 35 can be commonly used for both the wide angle type and the narrow angle type, it is not necessary to prepare different worm wheels 35 for the wide angle type and the narrow angle type, and the number of kinds of worm wheels 35 can be reduced. Accordingly, it makes the control of parts of the worm wheel 35 easy, and the mold replacement work easy by reducing the number of molds and the number of molds or inserts for molding the worm wheel 35, and then, it can be possible to improve the productivity of wiper motors 10, 60 and reduce cost.

The contact position between the contact plates 57a and 57b and the relay plate 54 in both the wiper motor 10 of the wide angle type and the wiper motor 60 of the narrow angle type is set up at same positions to the connecting position of the motor body 11. Since the connector unit 56 and the relay plate 54 are usable in both the wide angle type and the narrow angle type, the number of types of the connector unit 56 and the relay plate 54 can be reduced. Accordingly, it makes the control of parts of the connector unit 56 and the relay plate 54 easy, and the mold replacement work easy by reducing the number of molds and the number of molds or inserts for molding the connector unit 56 or the replay plate 54, and then, it can be possible to improve the productivity of the wiper motors 10, 60 and reduce cost.

Furthermore, the position of the output shaft 30 in both the wiper motor 10 of the wide angle type and the wiper motor 60 of the narrow angle type is set up deviated from each other. The positions for forming the connecting holes 50 and 51 are set based on the wiping range of the wiper member, the position of the output shaft 30, or so on. Therefore, even if the contact positions between the contact plates 57a and 57b and the relay plate 54 of both wiper motor 10 and the wiper motor 60 are set up at positions equivalent each other, by setting up the positions of the output shafts 30 of the wide angle type and the narrow angle type deviated from each other, it is possible to form the connecting holes for wide angle 50 and the connecting holes for narrow angle 51 separately in the worm wheel 35, without overlapping the connecting holes for wide angle 50 and the connecting holes for narrow angle 51.

Though in the above embodiments the pair of connecting holes for wide angle 50 and the pair of connecting holes for narrow angle 51 are formed in the worm wheel 35, it is sufficient for each of connecting holes 50 and 51 to be formed with at least one pair thereof. Each of connecting holes 50 and 51 may be formed with two or more pairs thereof. In this case, it is possible to change the wiping range of the wiper member according to the types of vehicles or the like by changing the positions of the connecting holes 50 and 51 connected the connecting shaft 43.

The positions of formation of the connecting holes 50, 51 can be optionally changed considered the wiping range of the wiper member, the position of the output shaft 30, or the like. For example, in the above embodiments, the distance M from the axial center C of the worm wheel 35 to the axial center C2 of the connecting hole for narrow angle 51 is set less than the distance L from the axial center C of the worm wheel to the axial center C1 of the connecting hole for wide angle 50, but the distance M may be set more than the distance L, or the distance M and the distance L may be set equal.

The present invention is not limited to the above embodiments, but can be modified variously without departing from the scope of the present invention. For example, the wiper motors 10, 60 of the present invention are not only used in rear window devices of vehicles, such as automobiles, but also used in wiper devices installed in aircrafts or ships. Additionally, the motor body 11 is not limited to a brushed motor, but may be a brushless motor, for example.

The wiper motor is used to swingably drive a wiper member to wipe a window glass mounted on an automobile or the like so that the vision of a driver is improved.

While the present invention has been illustrated and described with respect to a particular embodiment thereof, it should be appreciated by those of ordinary skill in the art that various modifications to this invention may be made without departing from the spirit and scope of the present.

What is claimed is:

1. A wiper motor having a motor body, and a motion conversion mechanism converting turning motion of the motor body into swinging motion having a first swing range or a second swing range narrower than the first swing range and transmitting the swinging motion to an output shaft, wherein a position of the output shaft swung within the first swing range differs from a position of the output shaft swung within the second swing range, the wiper motor comprising:
   a worm driven by the motor;
   a worm wheel made meshing with the worm, in which at least a pair of first connecting holes for the first swing range and at least a pair of second connecting holes for the second swing range are formed at respective positions deviated in a radial direction from an axial center of the worm wheel so that each pair of the connecting holes opens on one end face in an axial direction of the worm wheel, wherein an angle between line segments defined on said one end face so as to extend from the axial center of the worm wheel to respective axial centers of the first connecting holes differs from an angle between line segments defined on said one end face so as to extend from the axial center of the worm wheel to respective axial centers of the second connecting holes; and
   a connecting shaft rotatably connecting the first connecting holes or the second connecting holes of the worm wheel to a first motion conversion member of the motion conversion mechanism, wherein the first motion conversion member meshes with an output gear integral with the output shaft, thereby swing a wiper member connected to the output shaft within the first or second swing range,
   wherein the axial center of each connecting hole of the pair of first connecting holes is disposed at the same, first distance from the axial center of the worm wheel, and the axial center of each connecting hole of the pair of second connecting holes is disposed at the same, second distance from the axial center of the worm wheel, the second distance being different than the first distance, and
   wherein the first connecting holes and the second connecting holes are alternatively disposed in a circumferential direction of the worm wheel.

2. The wiper motor according to claim 1, further comprising:
   a feed circuit electrically connected to the electric motor; and
   a relay plate attached to the other end face in the axial direction of the worm wheel and configured to cause a pair of contact plates to selectively take two states including a short-circuited state in which the contact plates are electrically connected to each other, and a non-short-circuited state in which the contact plates are not electrically connected to each other, when the relay plate is rotated with the worm wheel,
   wherein the relay plate is arranged at a predetermined position of the worm wheel,
   wherein the relay plate has a cut portion partially cut radially inward from an outer circumferential part thereof,
   when the wiper member is swung within the first or second swing ranges, and one of the pair of contact plates is positioned on the cut portion, the wiper member occupies one reversal position of each of the first and second swing ranges.

* * * * *